No. 716,360. Patented Dec. 23, 1902.
W. ANDERSON.
STUMP PULLER.
(Application filed Dec. 13, 1901.)
(No Model.)
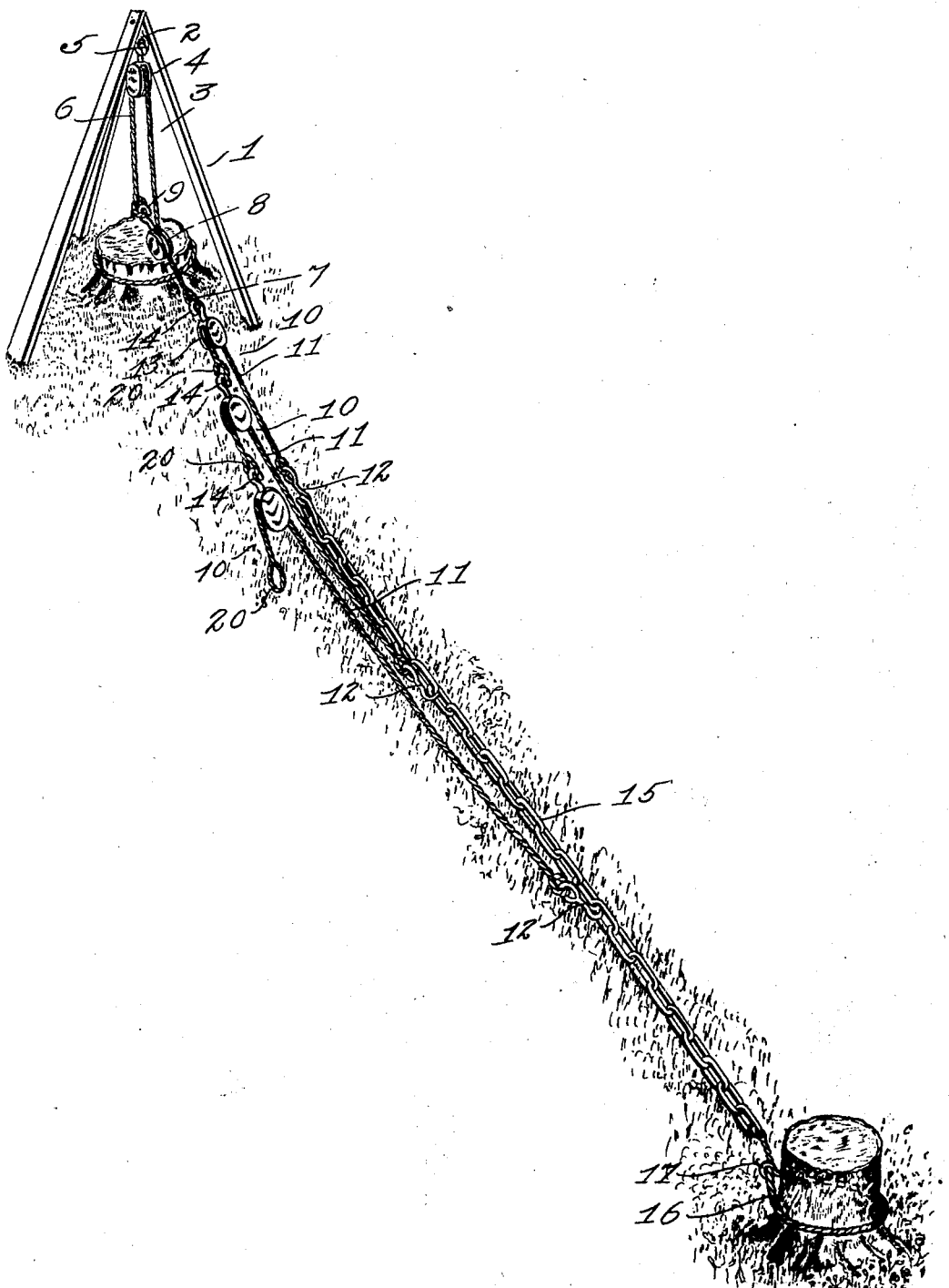
WITNESSES:
Emily H. Adams
Frank LaRoche
INVENTOR.
William Anderson
BY Frank E. Adams
ATTORNEY.

UNITED STATES PATENT OFFICE.

WILLIAM ANDERSON, OF BALLARD, WASHINGTON, ASSIGNOR OF ONE-HALF TO AXEL HOLMAN, OF SEATTLE, WASHINGTON.

STUMP-PULLER.

SPECIFICATION forming part of Letters Patent No. 716,360, dated December 23, 1902.

Application filed December 13, 1901. Serial No. 85,802. (No model.)

*To all whom it may concern:*

Be it known that I, WILLIAM ANDERSON, a citizen of the United States of America, and a resident of the city of Ballard, in the county of King and State of Washington, have invented certain new and useful Improvements in Stump-Pullers, of which the following is a specification.

My invention relates to devices adapted to pull stumps, and has special reference to machines of this class known as "tackle stump-pullers."

Among numerous objects attained by this invention and readily understood from the following specification and accompanying drawing, included as a part thereof, is the production of a simplified stump-puller of inexpensive construction and of great power and strength and embodying essential features of utility and adjustability which expedite its manipulation and render it capable of being applied in numerous ways.

The above and numerous other objects equally as desirable are obtained by the constructions, combinations, and arrangement of parts as disclosed by the drawing, set forth in this specification, and succinctly pointed out in the appended claims.

With reference to the drawing filed herewith and bearing like reference characters for corresponding parts throughout, the device is illustrated by a single perspective view showing the machine applied to a stump and indicating the several parts thereof in relative position for operation to extract the stump.

This invention includes a portable frame of any desired construction adapted as means to support the lifting-block of the tackle; but as I now consider the machine this frame is preferably made in the form of a tripod, as 1, consisting of a plurality of legs converging upwardly and suitably secured together by pivots or the like, whereby the frame can be opened and closed to facilitate erection and adjustment to set it astride the stump to be extracted. As now considered a suitable pendent eyebolt 2 is secured at the apex of the tripod to facilitate the hanging of the lifting-tackle, as 3, which as now included comprises a stationary single block 4, having a swiveled hook 5, adapted to engage said eyebolt, and a fall 6, adapted to be looped and secured about the stump at one end and having an eye 7, suitably formed at the running end, and a single block 8, running on said line intermediate the said stationary block and eye of the fall and having a hook 9, adapted for detachably securing the block to the portion of fall 5 which is secured about the stump, whereby the power applied to the fall to draw the stump is increased and said loose block is rendered readily detachable when desired to simply lift the stump, thereby expediting the lift after drawing.

The lifting-tackle is operated by a ground-tackle, consisting of a series or plurality of single whips 10, each having a block with a hook 14 and a fall 11, arranged with a hook 12 at the standing end and an eye 20 at the running end. These whips are all adapted for attachment to a suitable anchor, as 15, by means of the respective hooks 12, and are arranged as a series with the hook of the head-block engaging the eye in the fall of the lifting-tackle, the hook of the intermediate block engaging the eye of the fall of the head-block, and the hook of the tail-block engaging the fall of the intermediate block, and the running end of the fall of the tail-block adapted for attachment of the power to the machine. In the present embodiment the fall of the whip embodying the tail-block is rendered twice as long as the fall of the intermediate whip, and the fall of the whip, including the head-block, is rendered only half as long as the intermediate fall, so that the blocks of all the whips of the ground-tackle will simply have rope enough for relative travel, and thus avoid unnecessary length and weight. As now included the anchor 15 consists of a flexible line comprising connected loops or links, as a chain, which expedites the attachment of the hooks of the falls 11 at any desired points, and said chain is conveniently provided with a tie, as a rope 16, carrying a hook 17 at the free end, by which it can be readily fastened about any object to secure the anchor, as about a stump, tree, or the like. In practice it is customary to secure one end of the anchor-line as nearly the center of the field of operation as possible, so that the anchor can be swung about the entire field without unfastening same, and the hooks of the falls included in the ground-tackle can be adjusted along said anchor to conform to the points of lift.

It will be readily understood that the arrangements of the blocks of the ground-tackle as illustrated and heretofore set forth greatly multiplies the power applied to operate the machine, and the anchor-line renders the machine capable of extreme adjustment to accommodate it for operation at various points more or less remote from the point at which said anchor is secured. Furthermore, the particular lifting-tackle disclosed provides multiplied power, by which the stump is first drawn and is then adjustable to increase the speed of the lift.

Granted a desire to draw a stump, an operation of this device for the purpose would occur substantially as follows: The anchor-chain 15 is first secured by the tie 16 at a suitable point, the tripod 1 is placed over the stump, and the lifting-tackle arranged as heretofore described, the series of whips 10 are then each overhauled to bring the running ends of the falls close to the blocks, and said blocks are then connected as heretofore described, the hook of the head-block is then attached to the fall of the lifting-tackle, and the hooks at the stationary ends of whips 10 are attached to the anchor-chain at respective points, when the machine is ready for operation and power is applied to the fall of the tail-block. As will be understood, the stump is raised by the lifting-tackle almost straight up, with but a slight draw to one side, and when so elevated the dirt clinging to the roots can be knocked back into the cavity beneath the stump, after which the head-block of the ground-tackle can be attached directly to the loop of the fall of the lifting-tackle about the stump and the machine then operated to tip the stump over clear of its former seat.

Having thus described my invention, what I claim as new, and desire to secure by Letters Patent of the United States, is—

1. In a stump-puller; a lifting-tackle comprising a frame, a block suspended in the frame, a fall having one end adapted for looping about the stump and the other end adapted for the application of power, a second block on the fall intermediate the power end thereof and said suspended block and means to detachably connect said intermediate block to the looped end of said fall.

2. In a stump-puller; a ground-tackle comprising a series of whips including a head-block, an intermediate block, and a tail-block, a fall for each block arranged with a hook at the running end and an eye of the fall of the head-block adapted for connection to the intermediate block and that of the intermediate block adapted for connection to the tail-block, and means whereby said hooks can be adjustably anchored at various points along the line of draft of the tackle.

3. In a stump-puller; a ground-tackle comprising a series of single whips including a head-block, an intermediate block and a tail-block each having a hook, a fall for each block arranged with a hook at the stationary end and an eye at the running end said eye of the fall of the head-block adapted for connection to the hook of the intermediate block and the eye of fall of the intermediate block adapted for connection to the hook of the tail-block, an anchor-chain arranged at one end for securing to a fixed object and adapted for adjustable connection of the hooks of said falls.

4. In a stump-puller; a ground-tackle comprising a series of single whips including a head-block, an intermediate block and a tail-block each having a hook, a fall for each block and each fall being twice the length of the preceding fall and arranged with a hook at the stationary end and an eye at the running end said eye of the fall of the head-block adapted for connection to the hook of the intermediate block and the eye of the fall of the intermediate block adapted for connection to the hook of the tail-block, an anchor-chain having a tie at one end carrying a hook said chain adapted for adjustably anchoring the hooks of said falls.

5. A stump-puller of the nature indicated; consisting of a lifting-tackle composed of an adjustable tripod frame, a stationary block suspended therein, a fall in the block with one end adapted for looping about a stump and having an eye at the running end and a block on the fall intermediate the stationary block and said eye having a hook adapted for detachably connecting the block to the loop in said fall; and a ground-tackle comprising a series of single whips including a head-block having a hook adapted for connection with the eye of the fall of the lifting-tackle, an intermediate block and a tail-block both having hooks, a fall for each block and each fall being twice the length of the preceding fall and arranged with a hook at the stationary end and an eye at the running end said eye of the fall of the head-block adapted for connection to the hook of the intermediate block and the eye of the fall of the intermediate block adapted for connection to the hook of the tail-block, an anchor-chain having a tie at one end carrying a hook, said chain adapted for adjustably anchoring the hooks of said falls.

Signed at Seattle, Washington, this 18th day of October, 1901.

WILLIAM ANDERSON.

Witnesses:
M. M. CARRAHER,
WM. BREMER.